No. 729,203.

Patented May 26, 1903.

UNITED STATES PATENT OFFICE.

HANS MOLCHIN, OF ST. LOUIS, MISSOURI.

COMPOSITION OF MATTER.

SPECIFICATION forming part of Letters Patent No. 729,203, dated May 26, 1903.

Application filed February 9, 1903. Serial No. 142,674. (No specimens.)

*To all whom it may concern:*

Be it known that I, HANS MOLCHIN, a subject of the Emperor of Germany, residing at the city of St. Louis, State of Missouri, have invented certain new and useful Improvements in Compositions of Matter, of which the following is a specification.

This invention relates to compositions of matter to be used in making fireproof brick for buildings, partition-walls, linings of framework, and the like; and it consists of improvements whereby such compositions are rendered tougher or capable of resisting a greater tensile strain and capable of greater fire resistance.

The composition consists of a close mixture of calcined gypsum or calcium sulfate, which is ordinarily termed "plaster-of-paris," coal-cinders, mica, slaked lime, and silicate of soda.

The above-mentioned component parts of my new composition are commingled together in the following manner: First of all water is placed in a tank and three per cent. of dissolved lime is poured into it. Then enough plaster-of-paris mixed with mica is put in the water to make a clinging mass. To this mass is added sifted cinders of bituminous or anthracite coal, said cinders being graded either fine or coarse, according to the size of bricks to be formed of the composition. Beaten or pulverized brick may also be used instead of the coal-cinders. The composition is then stirred rapidly, so that the different elements hereinbefore set forth will be quickly mixed. The mixture at this point is almost ready to be poured into the molds; but before doing so it is necessary to add, just before the mixture is put in the molds, a suitable amount of silicate of soda or other ingredient having like properties. It is important to add the silicate of soda in such proportions as to secure its beneficial effects in the composition and to make the resulting product most efficient and at the same time not to put so much silicate of soda in the mixture as to make it non-adhesive or its product brittle. Without the silicate of soda in the composition it is open to the objection of being too porous, which causes it to be absorbent of water to an undesirable degree, which injures the practical value of the composition when used as a building material exposed to the weather. The addition of silicate of soda to the composition makes it more dense and impervious to water and increases its capacity for withstanding the weather.

The plaster-of-paris in the composition makes it set and adapts it to be molded. The sifted cinders, pulverized brick, or similar porous article makes the material strong, tenacious, and one which is bound closely together in all its parts, because the plaster is absorbed into the pores of the cinders or similar ingredient. The mica is unburned ground mica and is introduced for the purpose of increasing the fireproof character of the composition.

The proportions that I have found practical and to give the best results in the making of my said composition are as follows: forty-five parts, by weight, of plaster-of-paris; fifty parts, by weight, of coal-cinders; two parts, by weight, of mica; three parts, by weight, of slaked lime.

The silicate of soda when purchased in the market fifty-six per cent. C. P. is added to the foregoing mixture in the proportion of .002 per cent. to the entire mass. In order that the silicate of soda may be mixed quickly with the parts of the composition previously compounded, so as not to allow them to set and so as to intermingle the silicate of soda with all parts of the composition, I prefer to mix the silicate of soda with water in a vessel in the proportion of one part of silicate of soda to seven parts of water and then quickly to stir same into the mass. After the silicate of soda is added to the composition the composition is poured into suitable molds or frames, and the contents of these molds or frames is then exposed to the atmosphere.

The slabs or blocks of the fireproof material formed of the foregoing composition have such consistency as to allow of their being nailed to wooden framework without splitting or breaking, and thus form a substitute for iron sheathing.

In the foregoing specification I have described not only the composition of matter which is the subject-matter of the present application, but also the process of forming same; but I reserve to myself the right to file a separate application for patent for said process.

Having thus described my said invention, what I claim, and desire to secure by Letters Patent, is—

1. A composition comprising a mixture of plaster-of-paris, a porous material like coal-cinders, mica, slaked lime, and silicate of soda, substantially as specified.

2. A composition comprising a mixture of pulverized plaster-of-paris, sifted coal-cinders, comminuted mica, slaked lime, and silicate of soda, substantially as specified.

3. A composition comprising a mixture of forty-five parts of pulverized plaster-of-paris, fifty parts of sifted coal-cinders, two parts of comminuted mica, three parts of slaked lime, and silicate of soda in the proportion of .002 per cent., the whole being hardened and set, substantially as specified.

In testimony whereof I have affixed my signature, in presence of two witnesses, this 9th day of November, 1902.

HANS MOLCHIN.

Witnesses:
MAUD E. LETCHER,
ADELAIDE HENSING.